UNITED STATES PATENT OFFICE.

KARL SCHIRMACHER, OF SODEN, GERMANY, ASSIGNOR TO FARBWERKE, VORM. MEISTER, LUCIUS & BRÜNING, OF HÖCHST-ON-THE-MAIN, GERMANY, A CORPORATION.

DISAZO WOOL DYE AND PROCESS OF MAKING SAME.

SPECIFICATION forming part of Letters Patent No. 693,670, dated February 18, 1902.

Application filed November 29, 1901. Serial No. 84,091. (Specimens.)

*To all whom it may concern:*

Be it known that I, KARL SCHIRMACHER, Ph. D., a citizen of the Empire of Germany, residing at Soden, Taunus, Germany, have invented certain new and useful Improvements in the Manufacture of Disazo Dyestuffs for Wool, of which the following is a specification.

I have found that the hitherto unknown ortho-para-diamido-ortho-phenolsulfonic acid may be used for the manufacture of disazo dyestuffs. The said acid may be diazotized and the resulting tetrazo compound then combined with two equivalents of an amin or a phenol or derivatives thereof, the equivalents being of the same compound or of different compounds. Among the disazo dyestuffs obtainable in this manner that made by combination with two molecular proportions of beta-naphthol is especially valuable.

The ortho-para-diamidophenol-ortho-sulfonic acid may be obtained by reducing the corresponding dinitrophenolsulfonic acid with the usual reducing agents. The ortho-para-diamidophenol-ortho-sulfonic acid may be separated from its solution as hydrochlorid. Like its salts it is soluble in water. On treatment with nitrite and hydrochloric acid it yields a tetrazo compound soluble to a yellow-brown solution. The dyestuff from this acid and beta-naphthol is obtained, for instance, as follows: 20.4 kilos of ortho-para-diamidophenol-ortho-sulfonic acid are transformed by means of sixty kilos of hydrochloric acid and 14.4 kilos of nitrite into the tetrazo compound. The latter is gradually introduced into a solution of 29.2 kilos of beta-naphthol (two molecular proportions) in sixty kilos of soda-lye. After some time the formation of the dyestuff is complete, and as it is soluble with difficulty it may be filtered off. It is soluble in water to a blue solution and dyes wool brown shades, which become black on subsequent treatment with bichromate.

Having now described my invention, what I claim is—

1. The herein-described process for the manufacture of a disazo dyestuff which consists in tetrazotizing ortho-para-diamidophenol-ortho-sulfonic acid and in combining it with two molecular proportions of beta-naphthol, substantially as set forth.

2. As a new product, the disazo dyestuff derived from tetrazotized ortho-para-diamidophenol-ortho-sulfonic acid and beta-naphthol, being soluble with difficulty in water to a blue solution, dyeing wool brown shades which become black on subsequent treatment with bichromate.

In testimony that I claim the foregoing as my invention I have signed my name in presence of two subscribing witnesses.

KARL SCHIRMACHER.

Witnesses:
ALFRED BRISBOIS,
JOHANN HARTENSTEIN.